US012619449B1

(12) United States Patent
Franco et al.

(10) Patent No.: US 12,619,449 B1
(45) Date of Patent: May 5, 2026

(54) SYSTEM AND METHOD FOR GENERATING A COMPACT UNWINDING TABLE FOR RECONSTRUCTING CALL STACKS TO MONITOR PROGRAM OPTIMIZATION

(71) Applicant: R.C.Raven Cloud LTD, Tel Aviv-Jaffa (IL)

(72) Inventors: Guy Franco, Tel Aviv (IL); Omer Yair, Ramat Gan (IL)

(73) Assignee: R.C.Raven Cloud LTD, Tel Aviv-Jaffa (IL)

( * ) Notice: Subject to any disclaimer, the term of this patent is extended or adjusted under 35 U.S.C. 154(b) by 250 days.

(21) Appl. No.: 18/600,322

(22) Filed: Mar. 8, 2024

(51) Int. Cl.
*G06F 9/44* (2018.01)
*G06F 9/448* (2018.01)
*G06F 11/30* (2006.01)

(52) U.S. Cl.
CPC .......... *G06F 9/4486* (2018.02); *G06F 11/302* (2013.01)

(58) Field of Classification Search
CPC .................................................... G06F 9/4486
USPC .......................................................... 717/130
See application file for complete search history.

(56) References Cited

U.S. PATENT DOCUMENTS

| | | | | |
|---|---|---|---|---|
| 5,339,431 | A * | 8/1994 | Rupp | G06F 8/54 |
| | | | | 717/162 |
| 7,426,719 | B2 * | 9/2008 | Chaiken | G06F 9/4484 |
| | | | | 714/25 |
| 8,291,381 | B2 * | 10/2012 | Lai | G06F 9/4484 |
| | | | | 717/124 |
| 9,880,925 | B1 | 1/2018 | Bienkowski et al. | |
| 11,003,764 | B2 * | 5/2021 | Shukla | G06F 21/54 |
| 11,604,718 | B1 | 3/2023 | Dullien et al. | |

OTHER PUBLICATIONS

Coto, Javier Honduvilla "DWARF-based Stack Walking Using eBPF", dated Nov. 29, 2022. Retrieved from: "https://www.polarsignals.com/blog/posts/2022/11/29/dwarf-based-stack-walking-using-ebpf", Mar. 8, 2024.

* cited by examiner

*Primary Examiner* — Evral E Bodden
(74) *Attorney, Agent, or Firm* — M&B IP Analysts, LLC

(57) ABSTRACT

A system and method for generating a compact unwinding table for call stack unwinding is provided. The method includes extracting a plurality of instruction entries and an offset value for each of the plurality of instruction entries from at least one frame description entry (FDE), wherein each of the at least one FDE contains information for the plurality of instruction entries; selecting a subset of the extracted plurality of instruction entries, wherein the subset includes relevant instruction entries for unwinding; generating the compact unwinding table based on the subset to include the instruction entries and respective offset values; and storing the generated compact unwinding table with respect to a source binary file.

20 Claims, 4 Drawing Sheets

SYSTEM AND METHOD FOR GENERATING A COMPACT UNWINDING TABLE FOR RECONSTRUCTING CALL STACKS TO MONITOR PROGRAM OPTIMIZATION

TECHNICAL FIELD

The present disclosure relates generally to computer processing, and in particular, to systems and methods for unwinding call stacks to monitor program optimization.

BACKGROUND

Cloud computing refers to the delivery of various services over the Internet. These services include storage, databases, servers, networking, software, analytics, intelligence, and more. Cloud computing offers faster innovation, flexible resources, and economies of scale.

Infrastructure as a Service (IaaS) is the most basic category of cloud computing services. With IaaS, the IT infrastructure—servers and virtual machines, storage, networks, and operating systems—are rented on a pay-as-you-go basis. Cloud resources cost refers to the expenses associated with using various services and infrastructure provided by cloud computing vendors. These costs can vary significantly based on numerous factors. Such factors include the type of resource, the usage of the resource, a region where the resource is deployed, and so on. The cost of cloud resources is a significant expense of companies providing SaaS over cloud infrastructure.

Traditional ways to reduce costs include, for example, and without limitation, using saving plans, changing resource types to reserve from on-demand instances, and the like, and more, as some providers offer options to reserve instances for a longer-term, often at a reduced rate compared to on-demand pricing. Other approaches for reducing costs include resizing an instance (e.g., reducing the compute power or memory of an instance). Yet another approach for reducing is a spot instance. A spot instance in cloud computing refers to a temporary, on-demand computing capacity that can be obtained at a significant discount compared to regular on-demand instances. Spot instances allow you to use spare computing capacity in a cloud provider's data center.

Though such techniques may offer some savings, these do not address the core problems of close compute power, which include the bottleneck in the execution of software. For example, an unoptimized piece of code may consume unnecessary computing power, thereby increasing the utilization of instances of cloud resources, which, in return, increases the overall cost. To this end, methods to optimize the bottlenecks in the workload (e.g., application, service, tasks, etc.) are desired for efficient processing, use of resources, and budget management.

Currently implemented methods to detect program optimizations and/or resource utilizations involve monitoring the execution of workloads through profiling such as, but not limited to continuous profiling, sample-based profiling, and the like. Profiling tracks the amount of time, power, memory, and the like, that are spent on the execution of workloads and their sub-components (e.g., function calls, call stacks, etc.) which are advantageous in diagnosing program and resource efficiency. To this end, methods to monitor and analyze performance at low overhead without additional computational load are desired. Unwinding of call stacks to backtrace and reconstruct call stacks may be performed to monitor the performance of workloads. It has been identified as a processor intensive process and remains a challenge for efficient and accurate diagnosis of program optimizations.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating a compact unwinding table for call stack unwinding. The method comprises: extracting a plurality of instruction entries and an offset value for each of the plurality of instruction entries from at least one frame description entry (FDE), wherein each of the at least one FDE contains information for the plurality of instruction entries; selecting a subset of the extracted plurality of instruction entries, wherein the subset includes relevant instruction entries for unwinding; generating the compact unwinding table based on the subset to include the instruction entries and respective offset values; and storing the generated compact unwinding table with respect to a source binary file.

Certain embodiments disclosed herein also include a non-transitory computer readable medium having stored thereon causing a processing circuitry to execute a process, the process comprising: extracting a plurality of instruction entries and an offset value for each of the plurality of instruction entries from at least one frame description entry (FDE), wherein each of the at least one FDE contains information for the plurality of instruction entries; selecting a subset of the extracted plurality of instruction entries, wherein the subset includes relevant instruction entries for unwinding; generating the compact unwinding table based on the subset to include the instruction entries and respective offset values; and storing the generated compact unwinding table with respect to a source binary file.

Certain embodiments disclosed herein also include a system for generating a compact unwinding table for call stack unwinding. The system comprises: a processing circuitry; and a memory, the memory containing instructions that, when executed by the processing circuitry, configure the system to: extract a plurality of instruction entries and an offset value for each of the plurality of instruction entries from at least one frame description entry (FDE), wherein each of the at least one FDE contains information for the plurality of instruction entries; select a subset of the extracted plurality of instruction entries, wherein the subset includes relevant instruction entries for unwinding; generate the compact unwinding table based on the subset to include the instruction entries and respective offset values; and store the generated compact unwinding table with respect to a source binary file.

Certain embodiments disclosed herein include the method, non-transitory computer readable medium, or system noted above, further including or being configured to perform the following steps: parsing and executing the at least one FDE that encodes the plurality of instruction entries as a virtual machine.

Certain embodiments disclosed herein include the method, non-transitory computer readable medium, or system noted above, further including or being configured to perform the following steps: sorting the relevant instruction entries in the subset based on the respective offset values.

Certain embodiments disclosed herein include the method, non-transitory computer readable medium, or system noted above, wherein the generated compact unwinding table is associated with an index node (i-node) value that is unique to the source binary file.

Certain embodiments disclosed herein include the method, non-transitory computer readable medium, or system noted above, wherein the compact unwinding table is stored in a cache memory.

Certain embodiments disclosed herein include the method, non-transitory computer readable medium, or system noted above, wherein the plurality of instruction entries contains information to modify at least one register address.

Certain embodiments disclosed herein include the method, non-transitory computer readable medium, or system noted above, wherein the at least one register address is any one of: an instruction pointer (IP), a stack pointer (SP), and a base stack pointer (BSP).

Certain embodiments disclosed herein include the method, non-transitory computer readable medium, or system noted above, further including or being configured to perform the following steps: identifying a binary for a current context received from a performance counter; retrieving the generated compact unwinding table of the source binary file by searching for the identified binary; and reconstructing an unwound call stack from the current context and the retrieved compact unwinding table of the source binary file.

Certain embodiments disclosed herein include the method, non-transitory computer readable medium, or system noted above, further including or being configured to perform the following steps: matching a first address of the current context to a first instruction entry of the instruction entries in the compact unwinding table; and determining a second address by modifying at least one register address of the current context according to information in the first instruction entry.

Certain embodiments disclosed herein include the method, non-transitory computer readable medium, or system noted above, wherein the method is performed at a user mode of an operating system of a server.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
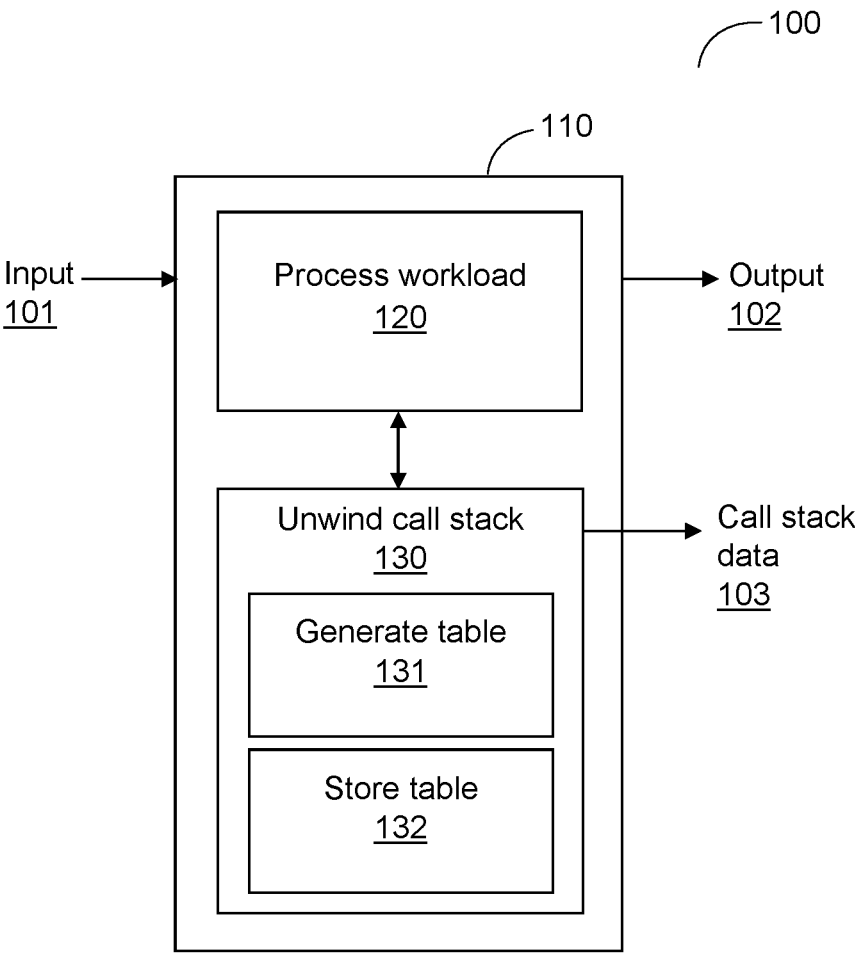
FIG. 1 is a flow diagram illustrating the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for generating a compact unwinding table for unwinding call stacks. The compact unwinding table enables accurate and efficient unwinding of call stacks to monitor program optimizations and utilization of computing resources. The compact unwinding table is stored in a memory based on an associated source binary file, which is commonly retrieved and utilized at the computing resources at various, for example, modes, containers, data paths, and more. It should be noted that a single compact unwinding table is generated and stored for the source binary file, thereby reducing the computational load with respect to time, power, and memory. Moreover, the generated compact unwinding table includes unwinding-related instruction entries and their corresponding address offsets and thus, is smaller in size for storage. The compact unwinding table acts as the lookup table for directing stack pointer (SP) and/or base stack pointer (BSP) modification in order to identify the next stack frame addresses and functions that had called a currently identified function.

The compact unwinding table, disclosed herein, is utilized to reconstruct the call stack by back tracing the consecutively processed functions of a workload or request of, for example, and without limitation, a service, an application, and the like. It should be noted that effectively unwound call stacks are utilized for analyzing program (or code) performance and optimization, as well as the utilization of computing resources for execution of the program. The embodiments disclosed herein generate and store a compact unwinding table for each source binary file that may be readily accessible from various containers, pods, and the like. In an embodiment, the entries of the compact unwinding table may be directly mapped to addresses, without additional processing, to identify the next call stack frames within the call stack. According to the disclosed embodiments, the generated compact unwinding table may be stored in a cache memory for rapid search and retrieval of the compact unwinding table for efficient unwinding of the call stack.

FIG. 1 is an example flow diagram 100 utilized to describe the various disclosed embodiments. A server 110 is a device, a component, or the like that is configured to perform a workload 120 of, for example, but not limited to, application, service, tasks, and the like, for an input request 101. The server 110 may be a standalone device, a cloud-based resource, or the like that is capable of performing computational tasks. The components of the server 110 are described below in FIG. 4. The disclosed embodiments are described with respect to a cloud-based resource for illustrative purposes, however, it should be noted that other configurations of the server 110 do not depart from the scope of the disclosed embodiments described herein.

The cloud-based resources are virtual components or capabilities that are provided by the cloud environment to perform workloads 120. The resources may be rapidly provisioned and released with minimal management effect and are accessible over the Internet. The cloud resource may be configured to perform requests of one or more workloads (e.g., service, application, etc.) at instances that are used on-demand based on needs for processing workloads. It should be noted that efficient usage of instances and resources as a whole is desired to reduce cost and, further, to conserve computing resources at, for example, the cloud resources (i.e., the server 110). The cloud-based resources communicate with one or more components within a cloud environment, which may be, but is not limited to, a public cloud, a private cloud, or a hybrid cloud. Some examples of a cloud environment may include, and without limitation, Amazon Web Services (AWS), Microsoft® Azure, Google Cloud Platform (GCP), and the like, which may also be referred to as cloud providers.

The server 110 is configured to process a workload 120, upon receipt of an input request 101, to generate an output 102. The processing of workload 120 includes performing a plurality of functions associated with the input request 101 involving construction and deconstruction of call stacks. A call stack is a data structure that keeps track of the active functions within the workload at the instance of the server 110. The functions of the plurality of functions are called, from the memory, according to the workload, to generate the call stack, which is deconstructed upon completion of the workload. In an example embodiment, an input request 101 is received from an end-user device for an application, which is processed 120, and the output 102 of the processed workload is returned to the end-user device. The input request 101 may include, for example, a plurality of threads which are sequences of events and functions that are processed accordingly.

The input 101 and output 102 data may be communicated over a network. The network may include, but not limited to, a wireless, cellular or wired network, a local area network (LAN), a wide area network (WAN), a metro area network (MAN), the Internet, the World Wide Web (WWW), similar networks, and any combination thereof. In some implementations, the input 101 and output 102 data may be communicated to a component in a common cloud environment as the server 110. In some other implementations, the input 101 and output 102 data may be received and returned within the server 110, for example, storing the output data 102 in a memory (e.g., the memory 420, FIG. 1).

According to the disclosed embodiment, the server 110 is further configured with an agent to perform the unwinding of the call stack 130 that was constructed and deconstructed during the processing of the workload 120. The agent may be realized as a piece of code stored in a memory of the server 110 and is executed over a processing circuitry of the server 110, as shown in the schematic diagram of the server 110 in FIG. 4. In an embodiment, the agent is a code that runs in the kernel of the operating system. In a further embodiment, the agent may run in a user mode by, for example, but not limited to, dynamically instrumenting the application code, using specific operation system (OS) functionalities (e.g., ptrace, etc.), or the like, and more. In an example embodiment, the unwinding of call stacks 130 may be utilized for profiling of functions, stack of functions, requests, and the like. In some implementations, the unwinding of the call stack may be performed in combination, portions in the kernal mode and portions in the user mode. As an example, the compact unwinding table may be generated at the user mode.

The unwinding of the call stack 130 traces one or more functions that are run during the processing of the workload 120 to reconstruct the call stack of the specific workload based on a current state or context of the server 110 (e.g., registers and the like). In an embodiment, registers such as, but not limited to, an instruction pointer (IP), a stack pointer (SP), a base stack pointer (BSP), and the like are received as the context. The unwinding of the call stack 130, for reconstruction, is performed to monitor performances and to collect unwound call stack data 103 that indicates the performance of functions and/or series of functions of the processed workload 120. Such real-time monitoring of function performances may be utilized to troubleshoot and/or optimize the functions, as well as their code, for improved utilization of various computational resources such as, but not limited to, processor, memory, input/output (I/O), and the like, and any combination thereof. v, potential bottleneck functions that exhaust computational resources may be determined by detecting, for example, but not limited to, repeated processing, extended processing time, and the like, and any combination thereof.

Functions such as, but not limited to, opening a file, sending over a network, sending data over a socket, and the like, and more, as well as their corresponding call stacks are collected as the call stack is unwound 130. Such collected data is stored in a memory (e.g., the memory 420, FIG. 4) or on a disk at the server 110. In an embodiment, the collected data may be provided as call stack data 103 to a database, a system, a device, or the like, which may be deployed in a common or a separate cloud environment as the server 110. The call stack data 103 that includes, for example, but not limited to functions, call stack of functions, return addresses for respective functions, additional metadata on the executing thread and/or process, additional metadata on the container, pod, and node, and the like, may be further analyzed to determine performance data (e.g., call stack counts, function count, time to process, and more) for the function, call stack, and the like. In an embodiment, the call stack output data 103 may be collected and sent to other components, servers, systems, devices, and the like, and any combination thereof, for example, over the network for the analysis. As an example, the call stack data 103 is transmitted to a separate server within a common cloud environment with the server 110. In another example, the analysis may be performed on a device in another physical location or another cloud environment.

In an embodiment, the unwinding of call stack 130 is performed intermittently at, for example, a predefined time interval, a trigger, and the like, and any combination thereof. The trigger for unwinding the call stack 130 may include, for example, but is not limited to, a page fault, a specific request, and the like, and more. In an embodiment, a CPU performance counter is interrupted intermittently to receive a current state or context of the server 110 (e.g., the server's CPU or core) at that specific time. The CPU performance counter provides the context such as, but not limited to, registers (e.g., instruction pointer, stack pointer, base stack pointer, etc.), and the like that are used as a beginning for unwinding the call stack 130. In an embodiment, the binary (or assembly) code is unwound during unwinding of the call stack 130. In some implementations, the unwinding of the call stack 130 may include unwinding of non-native binary (or managed code) such as, but not limited to, Java, Python, and the like.

A compact unwinding table is generated 131 and stored 132 for effective unwinding of call stacks 130 with lower overhead at the server 110. The generation of the compact unwinding table 131 selectively includes instruction entries for unwinding without irrelevant instructions, such as, but not limited to instructions that relate to debugging of the workload. As an example, the number of instruction entries in the compact unwinding table 131 may be reduced by a few orders of magnitude compared to the number of instruction entries in a binary file. In an embodiment, the generated compact unwinding table is stored 132 in a memory with respect to its binary file and reutilized. The binary file is the compiled code file that is executed at the server 110. In an embodiment, the compact unwinding table is stored in a cache memory 132 in order to provide rapid search and retrieval of the unwinding table. In a further embodiment, the instructions stored in the compact unwinding table are stored using index node (i-node) values. The i-node structure in Linux® allows identification of a binary file, independent from the container, data path, or the like. The i-node value is unique to the binary file. It should be noted that storing of the compact unwinding table based on the i-node value eliminates repeated generation of the compact unwinding table for the same binary file that is executed at multiple individual data paths or containers, thereby conserving computational power, time, as well as memory. The method to generate 131 and store 132 a compact unwinding table at lower computational load is described further below in FIG. 3 herein.

It should be noted that the example flow diagram 100 shows a single flow of processing workload 120 and unwinding call stack 130 for simplicity. The server 110 is configured to perform multiple flows as described herein simultaneously for, if needed, distinct workloads, applications, services, and the like, and any combination thereof. Simultaneous processing of workloads and requests is continuously performed in the server 110 (e.g., cloud resource), which may cause interdependencies in request performances.

Figure 2:
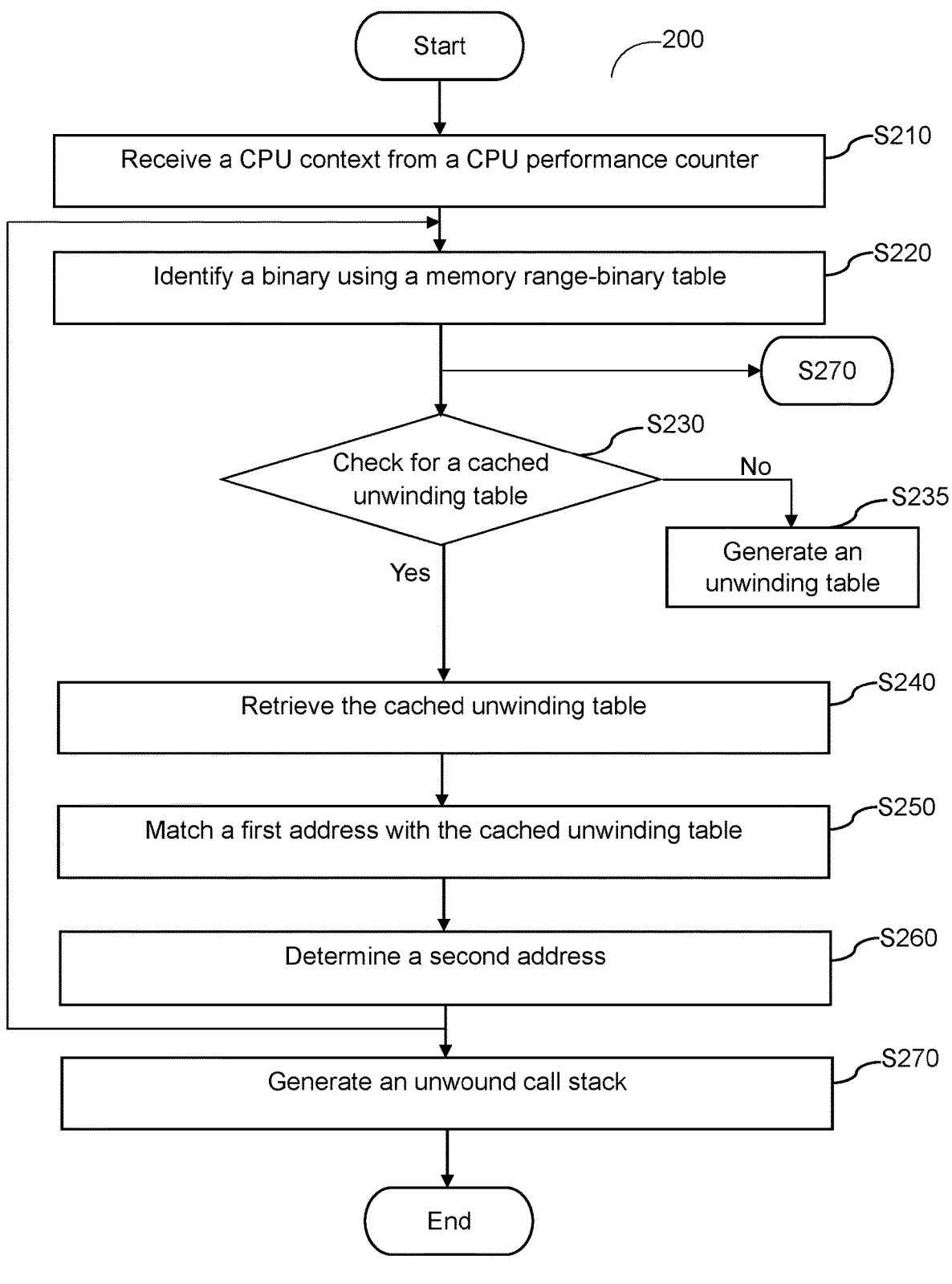
FIG. 2 is a flowchart illustrating a method for unwinding a call stack according to an embodiment.

FIG. 2 is an example flowchart 200 illustrating a method of unwinding a call stack according to an embodiment. The method described herein is performed in a server (e.g., the server 110, FIG. 1 and FIG. 4). The server may be a standalone device, a client-server configuration, a cloud-based resource, and the like, in, for example, a network environment. A cloud environment of the server may be a private cloud, a hybrid cloud, or a public cloud. An agent, a piece of code, is stored in a memory and executed in the server 110. It should be noted the process is described with respect to a single CPU context for simplicity and such unwinding of the call stack may be performed simultaneously for a plurality of workloads and/or requests of, for example, application, service, and the like, that are processed at the server 110.

The call stack is a data structure that keeps track of active events (or functions) within the workload, thread, request, process, or the like, as a pile of stack frames. The call stacks are often unavailable and thus, are reconstructed through unwinding. A current state or context (e.g., registers and the like) of the server 110 is received, for example, continuously, intermittently, periodically, or the like, and utilized as a top stack frame, a starting point, for backtracing functions that lead to calling of the current context function. The backtraced functions that called the current context are added as second stack frames below the top stack frame of the current context function, consecutively. Each stack frame includes, for example, but not limited to, local variables, parameters, a return address of the function call, and the like. In an embodiment, registers such as, but not limited to, an instruction pointer (IP), a stack pointer (SP), a base stack pointer (BSP), and the like are received as the context.

At S210, a CPU context is received from a CPU performance counter. The CPU context indicates a current state of the CPU and includes registers at the current moment. The received CPU context includes, for example, but is not limited to an instruction pointer (IP), a stack pointer (SP), a base stack pointer (BSP), and the like, and any combination thereof. The IP is a program register that indicates an address of a location in the memory that the current context and its instruction in the code of execution (e.g., the binary) is saved. The address held or pointed to by the IP is herein referred to as a first address. The CPU performance counter is stopped at predefined time intervals to provide the CPU context on a function that the CPU is running at the stopped time. As an example, the predefined time interval may be every 10, 25, 50 milliseconds, or the like. In some implementations, the CPU context is received when a CPU performance counter stops at an interrupt such as, but not limited to, a page fault, and the like. In an example, the CPU context is received for every page fault, every 10 page faults, every 1000 page faults, or the like. The interval between page fault-based interruption may be predetermined. In an example embodiment, the performance counter is stopped, and the context is received at certain trigger events such as, but not limited to, opening of a file, sending data over a network, and the like. It should be noted that the CPU context provides registers (or addresses) of the memory and the actual function and/or series of functions associated with the context is not yet known.

At S220, a binary including the received CPU context is identified. The corresponding binary is identified using a memory range-binary table that organizes binaries of applications according to the stored location in the memory (e.g., the memory 420, FIG. 4). The location in memory for the received CPU context is indicated by the IP, the first address. In an embodiment, when a binary of the received CPU context is not identified, the operation continues to S270 to generate an unwound call stack. An unavailable binary for the received CPU context (e.g., IP) suggests that there is no function that had called the current function and the current function is the first function executed in the workload. That is, the call stack of the workload has no additional call stack frames that are below the current stack frame (e.g., top stack frame) and the current stack frame is the bottommost stack frame. In an example embodiment, the IP or return address calculated by the received CPU context may point to, for example, but not limited to a zero value (i.e., NULL), garbage memory address, or the like.

At S230, it is checked if there is a cached unwinding table for the identified binary, and if so, execution continues with S240; otherwise, execution continues to S235 to generate an unwinding table for the identified binary. In an embodiment, the unwinding table is generated as disclosed in FIG. 3 herein below. The generated unwinding table may be stored in a cache memory for rapid search and retrieval.

At S240, the cached unwinding table is retrieved. The cached unwinding table is a data structure that includes information about a range of IP addresses and corresponding instructions. In an embodiment, the unwinding table is stored with respect to its source binary file and sorted by the offsets in the file, and thus, may be searched using a binary search technique. To this end, a single unwinding table is stored for the binary file regardless of the data path, container, or the like, thereby conserving memory. In an embodiment, the unwinding table is cached using an index node (i-node), in the Linux® operating system, in order to store with respect to the source binary file. The i-node may include metadata of the binary file, such as, but not limited to, file owner, permission, timestamp, memory location, and the like, and any combination thereof, as well as an i-node number. In an embodiment, the cached unwinding table is a compact unwinding table that is generated as described in FIG. 3, herein below. In an example embodiment, the cached unwinding table may be constructed from a DWARF format data, which includes debugging information, addresses, and the like, in a debugging information file format. In one embodiment, the unwinding table may be constructed from an Exception Handling Frame (EH Frame) structure. In another embodiment, the unwinding table may be constructed by analyzing the assembly instructions of the binary in order to determine offsets for the instructions within the binary. It should be noted that such construction from assembly instructions of the binary allows independent construction apart from other data structures, for example, EH Frame, DWARF table, and the like.

At S250, the first address of the CPU context is matched with an instruction in the cached unwinding table. In an embodiment, a binary search using the first address of the IP is performed for matching with the instruction (or instruction entry). The matched instruction provides information to modify the registers, SP and/or the BSP, that points to a return address pushed on the stack. In an embodiment, the cached unwinding table includes instruction entries for addresses that are relevant for unwinding of the call stack, and thus, additional processing of the unwinding table is not necessary for matching. In a further embodiment, the cached unwinding table is a compact table that includes unwinding related instruction entries and are organized based on the offset addresses of the binary.

At S260, a second address in the call stack is determined. The modified SP based on the matching provides the return address of the second function which is identified as the second address. Thus, the second function may be read from the memory based on the second address. The second address is a modified address from the first address using the unwinding table. The second address indicates a memory address for the second function that had called the function of the first address received as the current context (S210). The second function belongs to the second stack frame below the top stack frame including the function of the current context.

Upon determination of the second address of the second function, the operation returns to S220 to perform steps S220 through S260 using the determined second address rather than the first address. The second address is modified using the unwinding table to determine a next second address that indicates an address for a next second function that had called the second function. A plurality of second addresses may be determined by repeated operations of S220 through S260 that determine the next second address of the next second address and the stack frame below. As an example, with two repeated operations of S220 through S260, each with a new second address determined at S260, there will be one first address and two second addresses to result three stack frames that were serially performed for the workload. The repeated loop operation unwinds the call stack to track consecutively called functions from the top call stack frame (last called function or current state) to the bottommost call stack frame (earliest called function) for processing the workload.

At S270, an unwound call stack is generated. The unwound call stack includes at least a call stack frame for the first address from the CPU context and may further include one more second call stack frames for one or more second addresses that were successively determined then on from the first address. In an embodiment, offset values with respect to the beginning of the binary for each address (e.g., first address, one or more second addresses, etc.) are generated for the identified binary. It should be noted that the binary may be loaded into different locations in the memory in different processes and thus, the offset values for the determined addresses (corresponding to called functions) are generated and stored. In some embodiments, the offset values for the address may be determined based on offset values of the instruction entries in the retrieved unwinding table. In some implementations, the call stack may be gradually generated after the identification of each second function through the repeated loop operation from S220 through S260.

Figure 4:
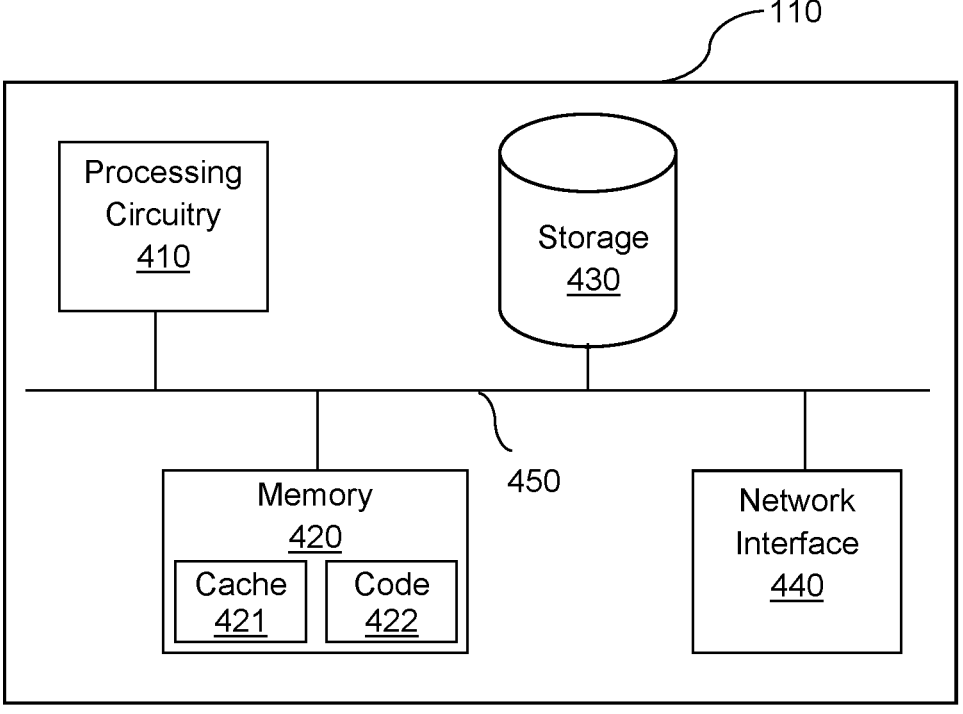
FIG. 4 is a schematic diagram of a server according to an embodiment.

The unwound call stack may be stored in a memory (e.g., the memory 420, FIG. 4) and/or a database (e.g., a database that communicates over a network with the server 110, FIG. 1 and FIG. 4, not shown). In an embodiment, the unwound call stack may be associated with metadata including additional information on, for example, but not limited to, thread, processor, container, pod, node, and the like, and any combination thereof.

In an embodiment, the unwound call stacks that include one or more stack frames for functions called for the workload may be provided to another component, server, system, device, or the like. The separate component, server, or the like may be connected to the server (e.g., the server 110, FIG. 1 and FIG. 4) over a network, deployed within a same cloud environment, or the like. The call stack output data (e.g., 103, FIG. 1) including the unwound call stacks and associated metadata may be aggregated and analyzed to identify specific functions for the stack frames and performance data. Portions of the call stack output data may be aggregated and selected for providing to the other components. As an example, call stack output data of the same processor may be sent to one server and other call stack output data of another processor may be sent to another server.

In some implementations, the specific functions of the stack frames and/or the call stack may be determined through symbolization. A symbol table that includes information on offsets and respective function names is employed to match the offset values generated for the stack frames of the unwound table to the functions. The specific function names, parameters, local variables, and the like, and more may be identified. Such a process of symbolization may be performed for each unwound call stack.

As an example, an unwound call stack includes three functions that were serially called to call the first function identified from the received CPU context. The first function, which was most recently called and executed, is added as the top call stack frame of the unwound call stack upon identification. The second function that called the first function is determined through the unwinding loop operation and added as the next call stack frame below the top call stack frame of the first function. Thereafter, another unwinding loop operation using the information of the second function determines a third function (e.g., corresponding to the next second address noted above) that called the second function. The third function, which was called the earliest, is added as the bottom-most call stack frame in the unwound call stack. Here, the resulting unwound call stack is gradually generated through the unwinding operation as described herein and includes three call stack frames that are successively called from the third function that called the second function, which then called the first function. It should be noted that the addresses are collected and included in the stack frames during the unwinding process.

The unwound call stack for the workload may be stored in a memory. The stored unwound call stack may include one or more stack frames that include, for example, but not limited to, a memory address of code, a function name, an IP, and the like, and any combination thereof. In an embodiment, the performance of the workload and/or portions thereof (e.g., each call stack frame, function, instruction, or the like) may be monitored by tracking parameters such as, but not limited to, time taken, counts, faults, and the like, and any combination thereof as performance data. The parameters are monitored through processing of the workload during normal runtime and may be aggregated based on the metadata (e.g., the thread identifier (ID), processor identifier (ID), container, pod, and more) and analyzed for detecting program and/or code (e.g., compiled binary code, source code, and more) optimizations. Moreover, such parameters of the performance data may be utilized to diagnose, for example, but not limited to, bottleneck functions, utilization of computing resources while processing the various workloads, and the like, and more. In an example embodiment, profiling of the program such as, but not limited to, continuous profiling, sampling-based profiling, and the like, may be performed to monitor the processing and performance of functions, call stacks, and/or binary file as a whole.

Figure 3:
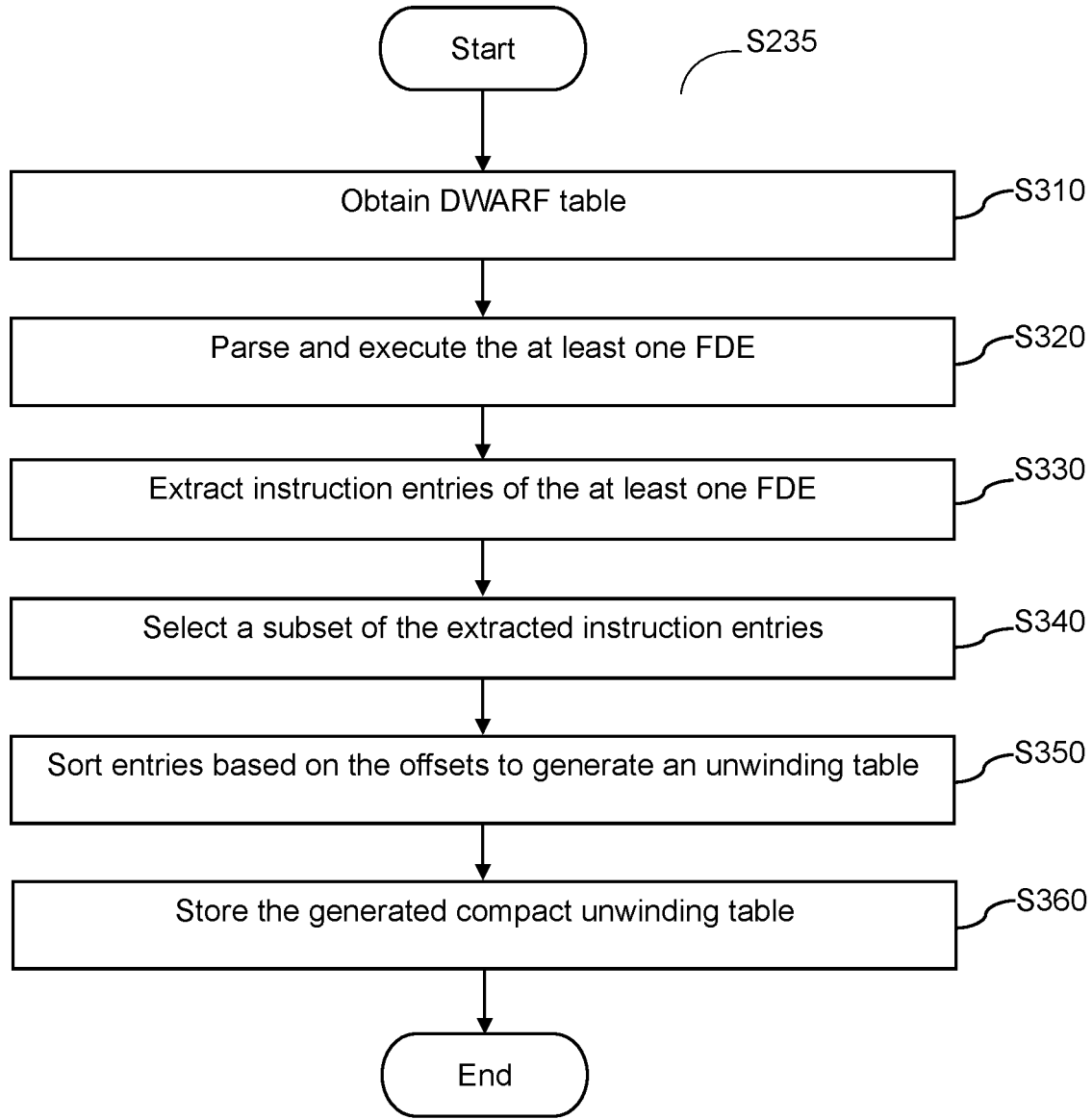
FIG. 3 is a flowchart illustrating a method for generating a compact unwinding table according to an embodiment.

FIG. 3 is an example flowchart S235 illustrating a method of generating a compact unwinding table according to an embodiment. The method is performed on a server (e.g., the server 110, FIG. 1 and FIG. 4) based on the agent (e.g., the code 422, FIG. 4) stored within. In an embodiment, the method as described is performed at a user mode of the operating system of the server.

The compact unwinding table may be generated when a new process (e.g., workload, request, and the like, for an application, service, or the like) is created. In an embodiment, the compact unwinding table is generated for the main binary (portion of executables) of the new process. As an example, when a new source binary file is loaded. Moreover, the compact unwinding table may be generated for a binary when the compact unwinding table is missing in a memory (or cache memory) during an unwinding operation, for example, as described in FIG. 2.

At S310, a DWARF table is obtained. The DWARF table contains debugging information in a format of a call frame information (CFI) and at least one frame description entry (FDE) for the binary (or machine code). The CFI and the FDE provide information on the assembly (binary) instructions and sequence of assembly instructions that were performed, including their location, type, order, and the like. As an example, the FDEs of the DWARF table may provide offsets and values for reverting registers back to a start of the function. Such reverting of registers may be utilized to determine the next address (e.g., the second address) and the next stack frame, that is positioned below, in the call stack. As noted above, the next stack frame includes a function (the address of) that had called the current function identified by the context. With repeated unwinding of the call stack, the next stack frame is any stack frame below the identified stack frame and includes information (e.g., address) of a function that called the function in the identified stack frame. An FDE includes one or more, often multiple, instruction entries, each for a binary instruction entry, that are encoded in a virtual machine (VM) for repeated operations. The FDE is encoded in order to reduce the number of instruction entries in the DWARF table.

At S320, the at least one FDE is parsed and executed. Each of the at least one FDE encoded in the VM is parsed and executed to understand the one or more instruction entries (hereinafter also referred to as "entries" for simplicity) of the FDE. As noted above, each FDE may include one or more instruction entries that are encoded as a single FDE in the DWARF table.

At S330, instruction entries of the at least one FDE are extracted based on the parsing and execution. The extracted instruction entries correlate with the instructions in the binary codes of the function and include directions to modify the registers (e.g., the SP and/or the BSP). That is, each extracted entry may be mapped with a distinct address in the memory (e.g., an IP) and includes values for reverting (i.e., modifying) the registers (e.g., the SP and/or the BSP) to the beginning of the function. An offset value is determined for each of the instruction entries based on an offset address for the respective FDE. As an example, the offset for a first instruction entry takes into consideration the offset of the FDE it belongs to, as well as the offset of the first instruction entry itself. It should be noted that the extracted instruction entries allow generation of a comprehensive unwinding table. It should be further noted that the extraction of instruction entries from the FDE of the DWARF table, as disclosed, eliminates repeated processing that may be required if the DWARF table is directly used, thereby reducing computing time, load, and the like. Moreover, such reduced computing load may also be apparent during the unwinding of the call stack using the unwinding table of extracted entries generated as disclosed herein.

At S340, a subset of the extracted entries is selected. The extracted entries from the at least one FDE of the DWARF table include instruction entries for each of the instructions in the binary for returning to the start of the function. The entries that are relevant for the unwinding of the call stack are selected as the subset of the extracted entries. At least a portion of the extracted entries that are not relevant for unwinding of the call stack (entries not in the selected subset) are discarded. Such irrelevant portions of the extracted entries may include, for example, but not limited to, entries that contain debugging information, entries that do not instruct SP and/or BSP modifications, and the like, and any combination thereof. The relevant entries in the selected subset include, for example, entries that instruct SP and/or BSP modification. In a non-limiting example, the relevant entries selected as the subset of extracted entries from the DWARF table may include entries corresponding to, for example, but not limited to, a prologue, an epilogue, or the like of a function in the binary.

At S350, the instruction entries are sorted based on the offsets to generate a compact unwinding table. The offsets for each of the instruction entries are utilized to order the instructions in rows, for example, and without limitation, from smaller to greater offset values. In an embodiment, a compact unwinding table of the sorted instruction entries is generated for the corresponding binary. The sorting based on offsets enables the binary search for mapping an address (e.g., the first address, one or more second addresses, etc.) to a corresponding instruction entry during the unwinding of the call stack (e.g., S250, FIG. 2). It should be noted that the generated compact unwinding table includes the subset of instruction entries that were determined from the DWARF table and excludes irrelevant instruction entries. It should be further noted that the smaller size of the compact unwinding table not only reduces storage space occupancy but also reduces computational time and power for searching and utilizing the unwinding table for unwinding the call stacks.

At S360, the generated compact unwinding table is stored in a memory. In an embodiment, the compact unwinding table is stored in association with an identifier (ID) of a binary file. The generated compact unwinding table may be retrieved using the ID of the binary file for unwinding of a call stack when the binary is identified based on the performance counter (i.e., the context). In an embodiment, the compact unwinding table may be stored in a cache memory (e.g., the cache memory 421, FIG. 4) and referred to as a cached unwinding table. In a further embodiment, the generated unwinding table is stored with respect to the source binary file using an i-node value, of the Linux® operation system, as the ID (e.g., an integer). Each file is stored with a unique i-node. The i-node for a generated unwinding table may include metadata, for example, but not limited to, a file owner, permission, timestamp, memory location, and the like, and any combination thereof.

In an embodiment, the compact unwinding table may be retrieved using the i-node, whenever the uniquely associated source binary file is executed at, for example, the server (e.g., the server 110, FIGS. 1 and 4). The compact unwinding table for the binary file is available and may be utilized for the respective code regardless of the data path, container, location in memory, and the like, and any combination thereof. The compact unwinding table does not require repeated generation, thereby reducing computational load. Thus, the compact unwinding table may only be generated and stored once; and retrieved from the memory thereafter.

In some implementations, a Kubernetes system may be employed for services, applications, and the like in a computing resource (e.g., the server 110, FIGS. 1 and 4) where a plurality of containers are run as a pod and a container may be run on multiple pods. The pods and, further, containers in the pod, may have different data paths even though the same binary file is run. The caching of the unwinding table with respect to the binary file enables retrieval of the cached unwinding table for the binary file for all instances, containers, and pods, regardless of the separate data paths. To this end, a single cached unwinding table is generated for the binary rather than multiple generations and storing copies of the same cached unwinding table for each of the data paths.

It has been identified that the process of, for example, parsing, executing, and analyzing the DWARF table may be compute intensive, and thus eliminating repeated processing, as disclosed, conserves computing resources such as, but not limited to, memory, computing time, power, and the like. Moreover, the execution of the DWARF table for extracting entries from the FDEs provides unwinding information for the relevant instruction entries. Such extracted instruction entries in the unwinding table may be directly mapped to an IP received from the performance counter during unwinding, thereby omitting the computationally intensive processing of the DWARF table during the process of unwinding the call stack. As noted above, the unwinding table generated as disclosed herein is a compact unwinding table that includes instruction entries for unwinding without, for example, those for debugging, and the like that are irrelevant for unwinding. In an embodiment, the compact unwinding table may be generated using information provided by the EH frame.

In another embodiment, the compact unwinding table may be generated by analyzing the assembly instruction entries to determine the offsets of the instructions in the binary. One or more functions, and their start and end instructions, are identified from the binary. Then, the instructions of the function may be analyzed to determine offset values for each of the instructions. In such a scenario, the operation may continue as described in steps S340 through S360 to select a subset of entries, to sort the entries, and to generate and store the compact unwinding table. It should be noted that the analyses of instruction entries may be performed apart from other data structures such as, but not limited to, the DWARF table, the EH frame, and the like, and more.

FIG. 4 is an example schematic diagram of a server 110 according to an embodiment. The server 110 includes a processing circuitry 410 coupled to a memory 420, a storage 430, and a network interface 440. In an embodiment, the components of the server 110 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof. In some configurations, the memory 420 may include a cache memory 421 for temporary storage of instructions and data that may be readily and rapidly accessed. As an example, the cache memory 421 stores one or more generated compact unwinding tables.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The memory 420 is configured to store a code 422 (i.e., an agent) for performing the disclosed embodiments described herein above. The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the server 110 to communicate with, for example, the resources, the user device, the databases, and the like, which may communicate via a network.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a compact unwinding table for call stack unwinding, comprising:

extracting a plurality of instruction entries and an offset value for each of the plurality of instruction entries from at least one frame description entry (FDE), wherein each of the at least one FDE contains information for the plurality of instruction entries;

selecting a subset of the extracted plurality of instruction entries, wherein the subset includes relevant instruction entries for unwinding;

generating the compact unwinding table based on the subset to include the instruction entries and respective offset values; and storing the generated compact unwinding table with respect to a source binary file.

2. The method of claim 1, further comprising:

parsing and executing the at least one FDE that encodes the plurality of instruction entries as a virtual machine.

3. The method of claim 1, further comprising:

sorting the relevant instruction entries in the subset based on the respective offset values.

4. The method of claim 1, wherein the generated compact unwinding table is associated with an index node (i-node) value that is unique to the source binary file.

5. The method of claim 1, wherein the compact unwinding table is stored in a cache memory.

6. The method of claim 1, wherein the plurality of instruction entries contains information to modify at least one register address.

7. The method of claim 6, wherein the at least one register address is any one of: an instruction pointer (IP), a stack pointer (SP), and a base stack pointer (BSP).

8. The method of claim 1, further comprising:

identifying a binary for a current context received from a performance counter;

retrieving the generated compact unwinding table of the source binary file by searching for the identified binary; and reconstructing an unwound call stack from the current context and the retrieved compact unwinding table of the source binary file.

9. The method of claim 8, further comprising:

matching a first address of the current context to a first instruction entry of the instruction entries in the compact unwinding table; and determining a second address by modifying at least one register address of the current context according to information in the first instruction entry.

10. The method of claim 1, wherein the method is performed at a user mode of an operating system of a server.

11. A non-transitory computer readable medium having stored thereon instructions for causing a processing circuitry to execute a process, the process comprising:

extracting a plurality of instruction entries and an offset value for each of the plurality of instruction entries from at least one frame description entry (FDE), wherein each of the at least one FDE contains information for the plurality of instruction entries;

selecting a subset of the extracted plurality of instruction entries, wherein the subset includes relevant instruction entries for unwinding;

generating a compact unwinding table based on the subset to include the instruction entries and respective offset values; and storing the generated compact unwinding table with respect to a source binary file.

12. A system for generating a compact unwinding table for call stack unwinding, comprising:

a processing circuitry; and a memory, the memory containing instructions that, when executed by the processing circuitry, configure the system to:

extract a plurality of instruction entries and an offset value for each of the plurality of instruction entries from at least one frame description entry (FDE), wherein each of the at least one FDE contains information for the plurality of instruction entries;

select a subset of the extracted plurality of instruction entries, wherein the subset includes relevant instruction entries for unwinding;

generate the compact unwinding table based on the subset to include the instruction entries and respective offset values; and store the generated compact unwinding table with respect to a source binary file.

13. The system of claim 12, wherein the system is further configured to:

parse and execute the at least one FDE that encodes the plurality of instruction entries as a virtual machine.

14. The system of claim 12, wherein the system is further configured to:

sort the relevant instruction entries in the subset based on the respective offset values.

15. The system of claim 12, wherein the generated compact unwinding table is associated with an index node (i-node) value that is unique to the source binary file.

16. The system of claim 12, wherein the compact unwinding table is stored in a cache memory.

17. The system of claim 12, wherein the plurality of instruction entries contains information to modify at least one register address.

18. The system of claim 17, wherein the at least one register address is any one of: an instruction pointer (IP), a stack pointer (SP), and a base stack pointer (BSP).

19. The system of claim 12, wherein the system is further configured to:

identify a binary for a current context received from a performance counter;

retrieve the generated compact unwinding table of the source binary file by searching for the identified binary; and reconstruct an unwound call stack from the current context and the retrieved compact unwinding table of the source binary file.

20. The system of claim 19, wherein the system is further configured to:

match a first address of the current context to a first instruction entry of the instruction entries in the compact unwinding table; and determine a second address by modifying at least one register address of the current context according to information in the first instruction entry.

* * * * *